United States Patent [19]

O'Connor

[11] Patent Number: 4,872,524
[45] Date of Patent: Oct. 10, 1989

[54] WHEEL-LESS WALKING DOLLY

[76] Inventor: Chadwell O'Connor, 2024 Galaxy Dr., Newport Beach, Calif. 92660

[21] Appl. No.: 181,037

[22] Filed: Apr. 13, 1988

[51] Int. Cl.⁴ ............................................. B62D 57/02
[52] U.S. Cl. ................................................... 180/8.6
[58] Field of Search .................... 180/8.6, 8.5, 8.1, 7.1; 305/1, 2

[56] References Cited

U.S. PATENT DOCUMENTS

| 2,918,718 | 12/1959 | Barr | 180/8.6 |
| 2,660,253 | 11/1953 | Davidson | 180/8.6 |
| 3,576,225 | 4/1971 | Chambers | 180/8.5 |
| 3,638,747 | 2/1972 | Althoff | 180/8.6 |
| 3,853,195 | 12/1974 | Rasanen | 180/8.6 |
| 3,913,452 | 10/1975 | Ward et al. | 91/411 R |
| 3,921,739 | 11/1975 | Rich et al. | 180/8.5 |
| 4,195,703 | 4/1980 | Hawkins et al. | 180/7.1 |
| 4,308,816 | 1/1982 | Jourdan | 180/8.5 X |
| 4,345,658 | 8/1982 | Danel et al. | 180/8.6 |
| 4,449,599 | 5/1984 | Creek | 180/8.1 |

FOREIGN PATENT DOCUMENTS

| 251484 | 1/1970 | U.S.S.R. | |
| 323516 | 2/1972 | U.S.S.R. | 180/8.6 |

Primary Examiner—John A. Pekar
Attorney, Agent, or Firm—Leydig, Voit & Mayer

[57] ABSTRACT

A platform movable in a horizontal plane by a plurality of underlying, initially vertical finger assemblies which reciprocate, half of which are driven down while the other half are retracted, and which then are cycled in the reverse fashion. The fingers are coupled to spherical surfaces reacting against reaction plates that can be controllably angled, with the result that the reciprocating fingers not only support the platform, but also move it horizontally by developing horizontal forces as a result of tilting the reaction plates.

8 Claims, 5 Drawing Sheets

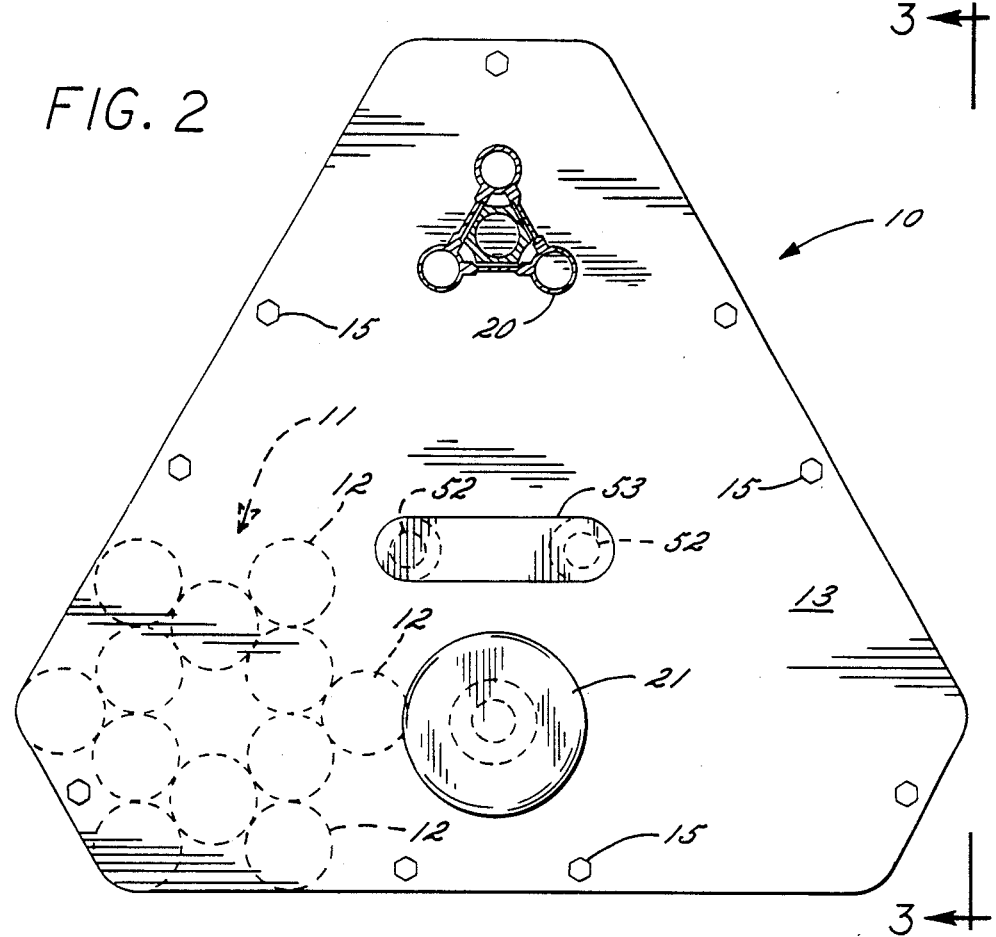
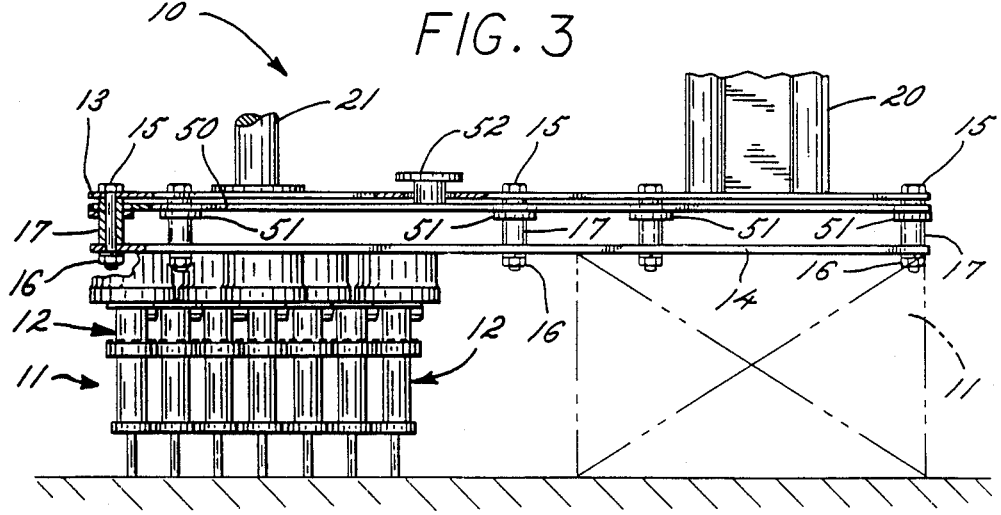

WHEEL-LESS WALKING DOLLY

BACKGROUND

This invention generally relates to movable platforms, such as those serving as camera dollies, and more particularly concerns a wheel-less, powered, movable platform.

Studio film cameras have traditionally been mounted on heavy wheeled dollies for movement over the studio floor. Also traditionally, such dollies were moved manually requiring, normally, at least two men to roll the dolly in accordance with the requirements of the filming.

Television tape, as opposed to film, cameras have become substantially lighter than studio movie cameras, it has become increasingly popular to film out of the studio "on location" where the underlying surface is not as flat and uniform as the studio floor, and there is increased resistance to employing several persons to simply move the dolly. Even for in-studio use, it would be desirable to have a dolly whose movement is unaffected by electrical cables on the floor.

Even with adequate manpower, such cameras had to be carefully moved so as to not roll over electrical cables and the like which would jar and deflect the camera.

Accordingly, it is an object of the invention to provide a powered platform that can, under control, move smoothly in any direction so that a single cameraman can not only operate the camera but also guide and move the dolly.

It is also an object to provide a platform of the above kind which is wheel-less and hence capable of moving across obstructions such as electrical cables in a studio, or door jambs on location, without tilting a supported camera. A related object is to provide a platform of the foregoing kind that is compact and, preferably, sized to fit through a conventional door while supporting a camera.

A further object is to provide a platform as characterized above that is subject to relatively simple mechanical control of movement, both as to direction and rate.

SUMMARY OF THE INVENTION

A movable platform for mounting, and carrying, an instrument such as a camera. It is supported on groups of vertically disposed fingers that can be reciprocally driven. In each group, half of the fingers are driven downwardly and the remaining half are biased upwardly, with this cycle being alternated and repeated. When powered downwardly, the fingers cause spherical surfaces to react up against a plate that can be controllably tilted with the result that tilting the plates cause the fingers to exert a horizontal force on the platform which moves the platform, walking on the fingers, in the direction determined by the tilting of the plates.

DRAWINGS

Other objects and advantages of the invention will become apparent upon reading the following detailed description and upon reference to the drawings, in which:

FIG. 2 is a plan, with the instrument supporting pedestal being sectioned, of the platform shown in FIG. 1;

FIG. 3 is an elevation taken along the line 3—3 of FIG. 2;

DESCRIPTION

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Figure 1:
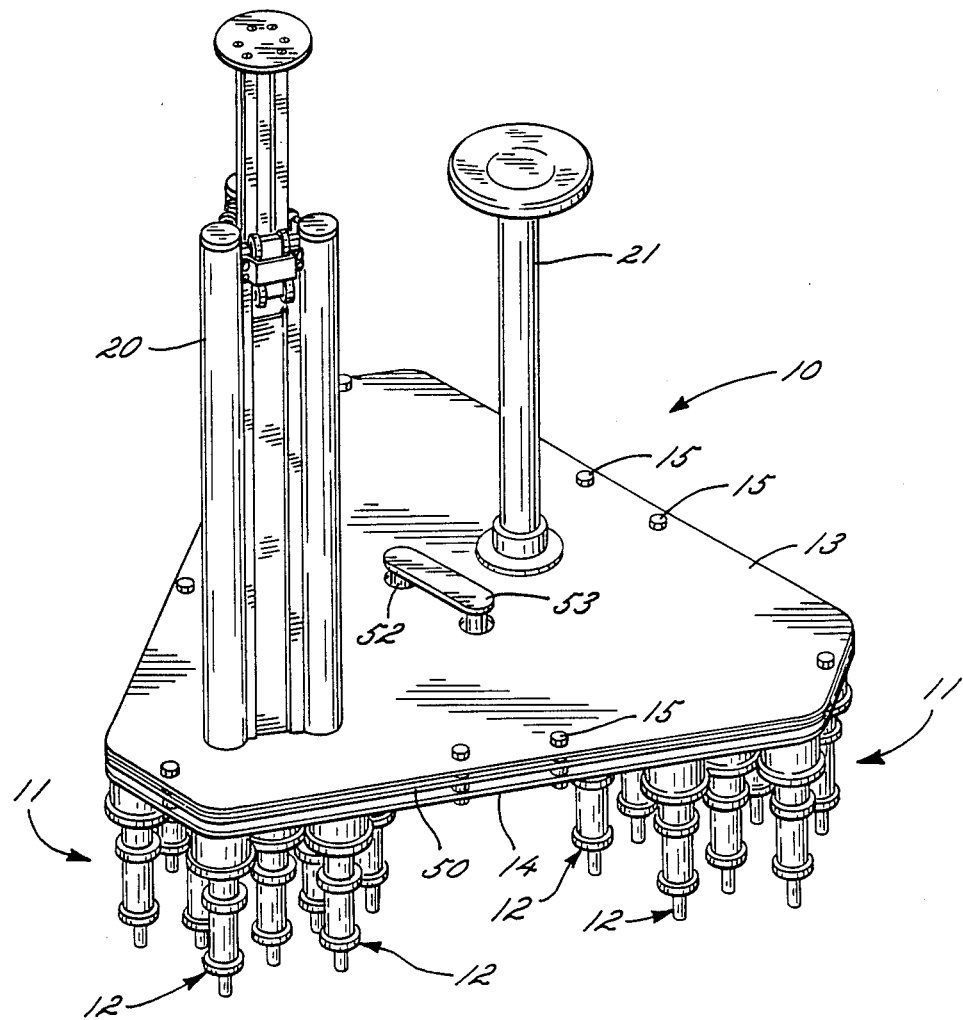
FIG. 1 is a perspective of a basic movable platform embodying the invention.

Turning to the drawings, there is shown in FIGS. 1, 2, 3 a movable platform 10 supported on groups 11 of finger assemblies 12. In this embodiment, three groups 11, each including twelve assemblies 12 are provided, making a total of thirty-six finger assemblies 12 supporting the platform. The platform itself includes a top plate 13 and a base plate 14 held firmly in spaced parallel relation by bolts 15, nuts 16 and spacer tubes 17. An instrument support pedestal 20 and an operator's stool seat 21 are secured to the top plate 13. Although not shown, the top plate 13 also is intended to support a housing enclosing a source of power and associated controls for reciprocating the fingers of the finger assemblies 12.

Figure 4:
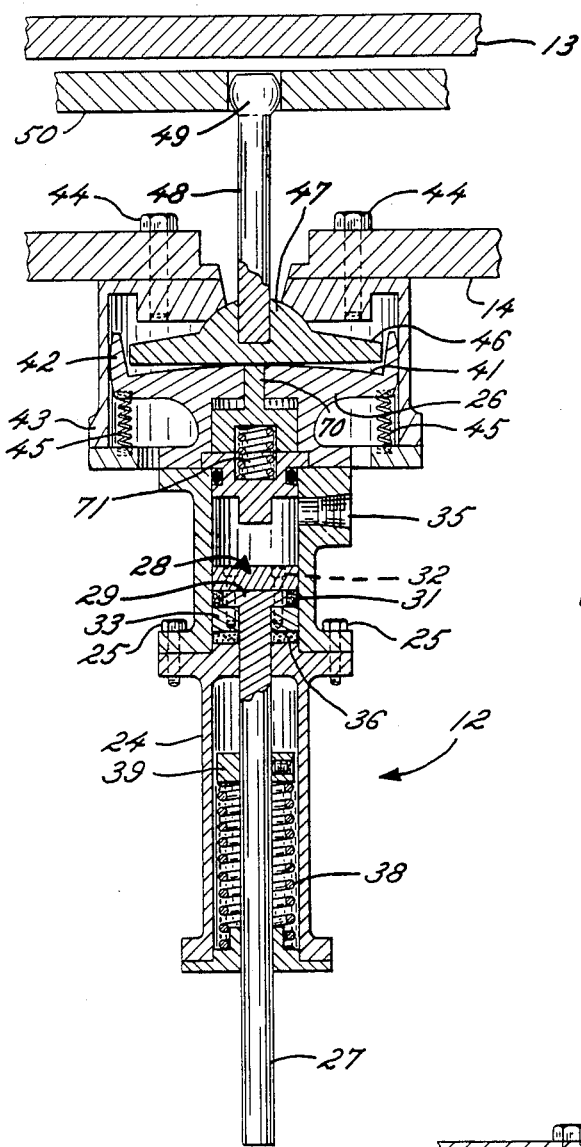
FIG. 4 is an enlarged vertical section of one of the supporting fingers for the platform appearing in FIG. 1.

In carrying out the invention, each finger assembly 12 (see FIG. 4), includes a sleeve, formed in two parts 23 and 24 secured together by screws 25, having a cap 26 and supporting a reciprocated finger defined by a rod 27 and a piston 28. The piston 28 reciprocates in the upper sleeve part 23 and therewith forms a fluid actuator. Preferably, the rod 27 has a small t-shaped end 29 which supports a surrounding annular seal 31 and which is sandwiched by a disc 32 and an annular washer-like member 33. Screws draw the disc 32 and the washer member 33 together, squeezing the seal 31 against the sleeve inner wall to provide fluid sealing engagement between the piston 28 and interior of the sleeve 23. Fluid under pressure introduced through a port 35 drives the finger rod 27 down into extended position. A cushioning element 36 at the bottom of the sleeve part 23 minimizes the resulting noise when the finger assembly is extended.

To retract the finger rod 27, a spring 38 is seated in the bottom of the sleeve part 24 and bears upwardly against a collar 39 secured to the rod 27. Release of pressure above the piston 28 therefore allows the finger rod 27 to be retracted upwardly under the force of the spring 38.

The cap 26 is formed with a spherical top 41 and has an annular periphery 42 which is held closely but movably in a housing 43 that is secured to the base plate 14 by screws 44. The cap 26 is held within the housing 43 and urged upwardly by a plurality of springs 45 spaced around the periphery of the cap. The spherical surface 41 therefore bears on the flat bottom surface of a reactor plate 46 having a spherical top surface 47 socketed in the top wall of the housing 43.

The reactor plate 46 can be controllably tilted in any direction by a pin 48 fixed to the plate and having a rounded head 49 trapped in a hole formed in a control plate 50. The control plate 50 is substantially coextensive with the top plate 13 and is slidably mounted just beneath the top plate on support washers 51 secured to the plate spacing tubes 17. The control plate similarly engages pins secured to all of the finger assemblies and, near the center of the top plate 13, posts 52 fixed to the control plate 50 extend up through holes on the top plate 13 and are connected by a foot control bar 53. If an operator on the stool 21 moves the bar 53 toward the pedestal 20 without rotating the bar, the control plate 50 will tilt all of the finger assembly pins 48 and the attached reaction plates 46 in one direction and, similarly, movement of the bar 53 in any other direction, without rotation of the bar, will similarly tilt the reaction plates 46 in that direction. If the bar 53 is rotated, as an operator pushing forward with one foot on one end of the bar and pulling back with the other foot on the other end of the bar, then the control plate 50 will also be rotated about the approximate center of the platform and all of the reaction plates 46 will be tilted along lines tangent to circles having their centers at the center of the movable platform 10. The significance of these various controlled movements of the reaction plates will be explained below.

Figure 6:
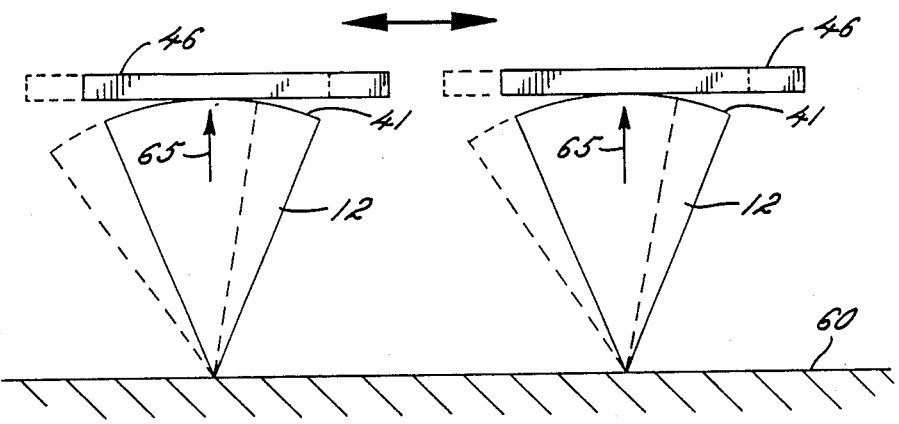

Pursuant to the invention, the spherical surface 41 has a radius equal to the extended length of the finger assembly 12 which has the effect shown schematically in FIG. 6. With the assemblies 12 extended, the plates 46 rest on what are, in effect, inverted wheel segments. The wheel axes engage the floor 60 and the assembly surfaces 41 roll on the plates 46 which, of course, solidly support the platform 10. The platform is thus held in a horizontal level position through the full tilt range of the finger assemblies 12.

Figure 5:
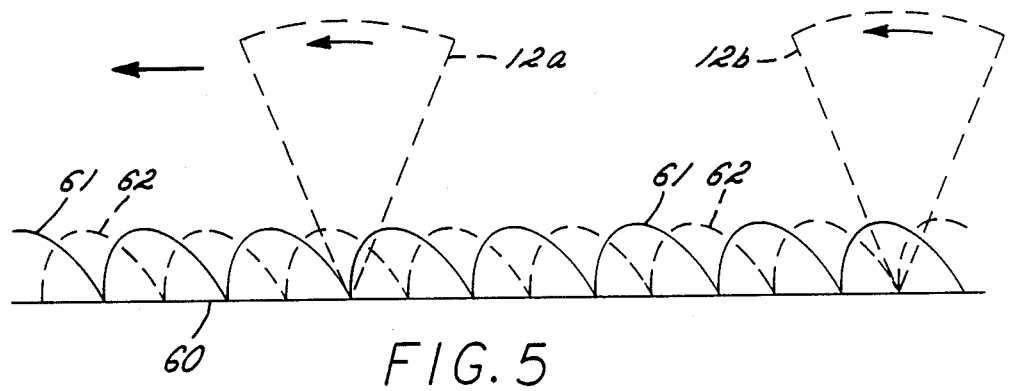
FIGS. 5, 6 and 7 are diagrams illustrating the principle of operation of the platform appearing in FIG. 1.

In operation, one half of the finger assemblies are fully extended while the other half are cycling through retraction and extension back to the fully extended position. The pattern of actuation is spaced within each of the groups 11 so as to evenly support the platform. The effect of this is shown schematically by FIG. 5. The solid and dashed lines 61 and 62, respectively, represent the successive locus followed by the lower tips of finger assembly rods 27 as the finger assemblies reciprocate and tilt with the movement of the platform—to the left in this case. While the tips following the lines 61 are extended into solid contact with the floor, the rods are tilting as suggested by the diagram 12a and are holding the platform level as diagrammed in FIG. 6. The tips following the lines 62 are then retracting and extending, and when they are supporting the platform and tilting is suggested by diagram 12b, the tips following the solid lines 61 are cycled up and down again. It can therefore be seen that the platform can move smoothly in a horizontal plane by driving the finger assemblies 12 in cycles whereby one-half are kept fully extended while the other half are cycled.

Figure 7:
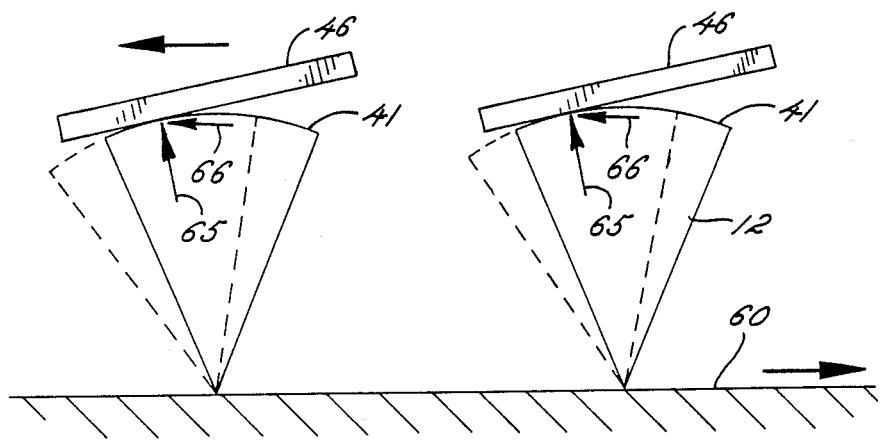

In order to provide the driving force in the desired direction of platform movement, the reaction plates 46 are tilted in the desired direction of movement, as schematically shown in FIG. 7. When so tilted, the extending forces 65 between the floor 60 and the plates 46, which are vertical in FIG. 6, are angled to the left in FIG. 7 so as to have a horizontal component 66. As a result, each time one of the finger assemblies 12 is extended and engages the floor, it exerts a force in the direction that the plates 46 have been tilted. If the operator moves the bar 53 directly toward the pedestal 20, for example, the plate 50 will tilt all of the reaction plates 46 in that direction with the result that the platform 10 will move in that direction. If the operator manipulates the bar 53 so as to rotate the plate 50, the plates 46 will be tilted in a circular orientation and a platform 10 will rotate.

The horizontal forces 66 exist until the finger assemblies 12 are fully extended—and they have tilted as shown by the dashed lines in FIG. 7. It will be appreciated that for the next cycle of reciprocation to also produce a horizontal force component, the finger assemblies 12 must be returned to a starting vertical position, and this is an important feature of the invention.

Figure 4A:
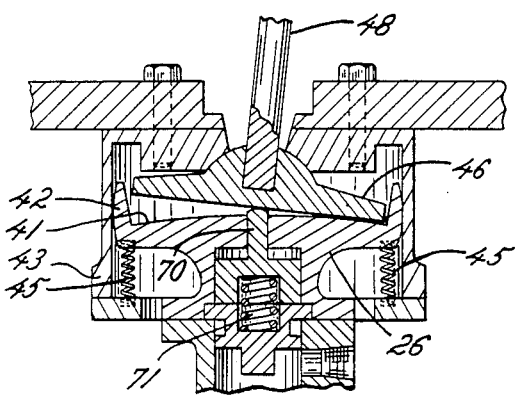
FIG. 4a is a fragment of FIG. 4 with parts in an alternative position.

To insure that each finger assembly 12, when retracted, assumes a vertical orientation even though its reaction plate 46 is tilted and the finger assembly, when extended, is angled, a pin 70 is slidably fitted in the cap 26 and biased upwardly by a spring 71. The force exerted by the spring 71 is greater than that exerted by single ones of the springs 45 suspending the cap 26, but less than the combined force of those springs 45. With the reaction plate tilted, as in FIG. 4a, the springs 45 will not restore the finger assembly 12 to vertical because the effective lever arm of the springs has changed. It requires more upward force at the right of the cap 26 in this figure, because of the short lever arm, than at the left of the cap in this figure, because of the longer lever arm, to hold the cap 26 as shown. The pin 70 provides the added force by, in effect, pushing the left side of the cap 26 down and assisting the springs 45 on the right that are urging the cap in that direction. The finger assemblies 12 therefore return to vertical for the next reciprocation cycle.

Figure 8:
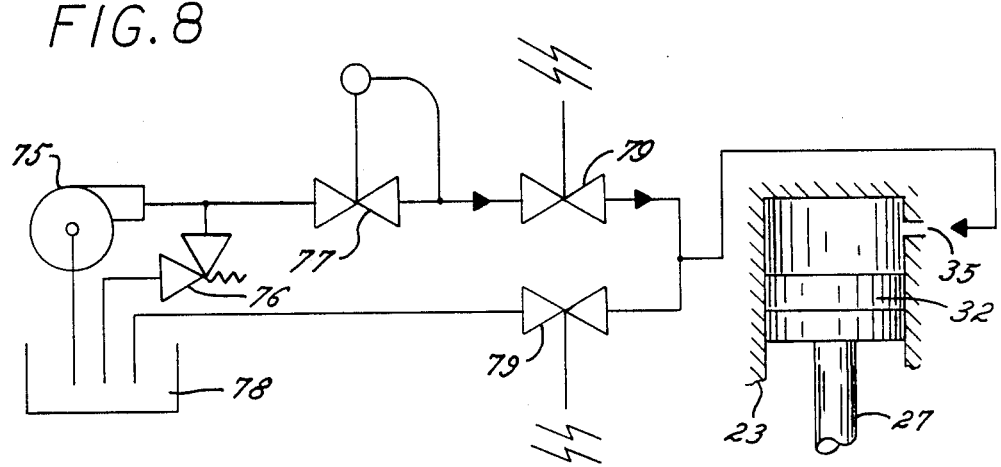
FIGS. 8 and 9 are schematics showing alternate ways of controlling the power driving the fingers supporting the platform as shown in FIG. 1.
Figure 9:
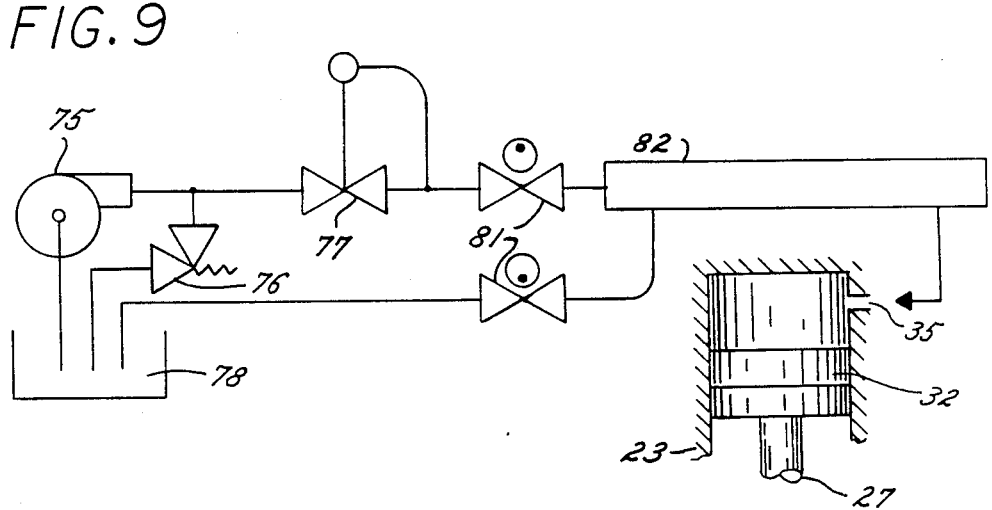

In the preferred embodiment, the finger assemblies are hydraulically powered as schematically shown in FIGS. 8 and 9. Fluid from a reservoir 78 is delivered by a pump 75 through a pressure control valve 77 to the ports 35. A pressure relief valve 76 in a line branching off that connecting the pump and the pressure control valve recirculates excess fluid back into the reservoir 78. In the embodiment of FIG. 8, electrically controlled valves 79, a set for each of the finger assemblies 12, time the application of fluid to produce the desired operation. In the embodiment shown in FIG. 9, mechanically timed valves 81 feed fluid to a manifold 82 which is connected to a plurality of the finger assemblies that are to be simultaneously actuated. It is contemplated that the finger assemblies be driven at a rate on the order of 20 to 30 cycles per second and, as stated above, one-half of the fingers will be fully extended at any given time. The horizontal speed of platform movement depends on the finger cycling speed and the angle of the reaction plates, the latter controlling the distance each finger assembly rod 27 steps during each cycle.

Considering an operating fluid pressure of 20 psi and an approximate piston area of 1 inch, the illustrated platform 10 having 36 finger assembly units would have 18 engaging the floor at one time each exerting an approximate 20 pound force. With one-half of the 36 units actively supporting the platform at any given time, this equals a support for some 360 pounds which should be sufficient to carry a 100 pound camera and an operator.

If one of the finger assemblies strikes an object above the level of the floor such as a door jamb or an electrical cable, it will exert 20 pounds of force but will simply not fully extend. That 20 pounds will be insufficient to tilt or tip the platform so that the platform remains horizontal as it walks over electrical cables or other obstructions.

I claim as my invention:

1. A movable platform comprising, in combination, a base plate, a plurality of extendable fingers mounted on said base plate for engagement with the underlying surface and for tilting movement relative to said base plate, means for driving said fingers cyclically between extended and retracted positions with one portion of the fingers being extended while the other portion are retracted, and means for controllably angling said tiltable fingers relative to said base plate so that the portion of fingers being extended exert an upward and angled force on the base plate with the horizontal component of that force moving the base plate in the direction the fingers tilt, said means for controllably angling said tiltable fingers being capable of tilting the fingers in a range of directions from the vertical so that the horizontal force will move the base plate in any horizontal direction within said range.

2. The combination of claim 1 including spring biased pins for restoring said fingers to substantially vertical position when the fingers are retracted.

3. The movable platform of claim 1 wherein the fingers are capable of being tilted in any direction from the vertical so that the horizontal force will move the base plate in any horizontal direction.

4. A movable platform comprising, in combination, a base plate, a plurality of extendable fingers mounted on said base plate for engagement with the underlying surface and for tilting movement relative to said base plate, means for driving said fingers cyclically between extended and retracted positions with one portion of the fingers being extended while the other portion are retracted, and means for controllably angling said tiltable fingers relative to said base plate so that the portion of fingers being extended exert an upward and angled force on the base plate with the horizontal component of that force moving the base plate in the direction the fingers tilt, said means for controllably angling said fingers including a universally tiltable reaction plate for each finger which engages a spherical surface comprising the upper surface of each finger.

5. The combination of claim 4 in which said spherical surfaces have radii equal to the extended length of said fingers.

6. The combination of claim 4 in which said reaction plates are coupled for simultaneous tilting movement to control the direction in which said platform moves.

7. A propelling finger assembly for a movable platform comprising, in combination, a sleeve, a rod and piston slidable in said sleeve, means for permitting pressure to drive said piston and rod in one direction, a spring in said sleeve for urging said rod and piston in the opposite direction, a cap fixed to said sleeve and having a spherical top surface, a housing surrounding said cap, a reactor plate mounted in said housing for tilting movement, mans biasing said spherical top surface against said reaction plate, and means for tilting said reaction plate so as to vary the contact point between the plate and said spherical surface.

8. The combination of claim 7 including a pin slidably mounted in said cap and being biased against the approximate center of said reaction plate so as to urge said sleeve, piston and rod into substantially vertical position regardless of any tilt of the reaction plate.

* * * * *

UNITED STATES PATENT AND TRADEMARK OFFICE
CERTIFICATE OF CORRECTION

PATENT NO. : 4,872,524

DATED : October 10, 1989

INVENTOR(S) : Chadwell O'Connor

It is certified that error appears in the above-identified patent and that said Letters Patent is hereby corrected as shown below:

In the Claims:

Column 6, line 25, change "mans" to -- means --.

Signed and Sealed this

First Day of October, 1991

Attest:

HARRY F. MANBECK, JR.

Attesting Officer

Commissioner of Patents and Trademarks